United States Patent
Jeong et al.

(10) Patent No.: US 9,629,048 B2
(45) Date of Patent: Apr. 18, 2017

(54) MOBILE COMMUNICATION SYSTEM AND METHOD OF INFORMATION PROCESSING FOR IMPROVING USER EXPERIENCE IN THE MOBILE COMMUNICATION SYSTEM

(71) Applicant: Samsung Electronics Co., Ltd., Suwon-si, Gyeonggi-do (KR)

(72) Inventors: Sang Soo Jeong, Suwon-si (KR); Song Yean Cho, Seoul (KR); Beom Sik Bae, Suwon-si (KR); Jung Je Son, Yongin-si (KR); Han Na Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/346,819

(22) PCT Filed: Sep. 28, 2012

(86) PCT No.: PCT/KR2012/007945
§ 371 (c)(1),
(2) Date: Mar. 24, 2014

(87) PCT Pub. No.: WO2013/048199
PCT Pub. Date: Apr. 4, 2013

(65) Prior Publication Data
US 2014/0235249 A1    Aug. 21, 2014

(30) Foreign Application Priority Data

Sep. 29, 2011    (KR) .................. 10-2011-0098770

(51) Int. Cl.
*H04W 36/00* (2009.01)
*H04W 36/12* (2009.01)
(Continued)

(52) U.S. Cl.
CPC .......... *H04W 36/12* (2013.01); *H04W 36/26* (2013.01); *H04W 36/30* (2013.01); *H04W 48/08* (2013.01)

(58) Field of Classification Search
CPC ..... H04W 36/12; H04W 36/26; H04W 36/30; H04W 48/08
(Continued)

(56) References Cited

U.S. PATENT DOCUMENTS 7,933,248 B2 *    4/2011    Hong ................... H04W 36/24
                                                  370/332
8,635,335 B2 *    1/2014    Raleigh ............... H04W 36/245
                                                  455/456.3
(Continued)

FOREIGN PATENT DOCUMENTS

JP    2008-104190 A    5/2008
KR    10-0809260 B1    3/2008
(Continued)

OTHER PUBLICATIONS

Panasonic et al., Interaction of ANDSF with Enhanced Policy Framework, 3GPP TSG SA WG2 Meeting #81, Prague, Czech Republic, Oct. 11-15, 2010, pp. 1-2, TD S2-104705, 3GPP, Sophia-Antipolis Cedex, France.
(Continued)

*Primary Examiner* — Khai M Nguyen
(74) *Attorney, Agent, or Firm* — Jefferson IP Law, LLP

(57) ABSTRACT

The present invention relates to a method for processing information between mobile communication systems in order to prevent the degradation of user-experienced performance when different types of mobile communication networks are used. The method for processing information at user equipment (UE) to improve user-experienced performance of a mobile communication system includes perform-
(Continued)

ing a data communication through a first network and receiving, from a policy server, a routing policy including a validity condition which is information about a condition of designating a UE status for handover. The method further includes, in the handover, if a searched second network satisfies the validity condition, performing the data communication through the second network. Accordingly, a network for data transmission can be selected using a routing policy created in consideration of a UE status or a network status, thereby enhancing user-experienced performance.

14 Claims, 6 Drawing Sheets

(51) Int. Cl.
*H04W 36/26* (2009.01)
*H04W 36/30* (2009.01)
*H04W 48/08* (2009.01)

(58) Field of Classification Search
USPC ................................ 455/437, 436, 444, 449
See application file for complete search history.

(56) References Cited

U.S. PATENT DOCUMENTS

| | | | |
|---|---|---|---|
| 2008/0095120 A1 | 4/2008 | Hong et al. | |
| 2008/0318576 A1* | 12/2008 | So | H04W 36/0066 455/436 |
| 2010/0003980 A1 | 1/2010 | Rune et al. | |
| 2010/0216462 A1* | 8/2010 | Aso et al. | 455/434 |
| 2010/0323698 A1 | 12/2010 | Rune et al. | |
| 2011/0110300 A1* | 5/2011 | Sachs | H04W 48/18 370/328 |
| 2012/0093031 A1* | 4/2012 | Wang | H04L 29/06 370/254 |
| 2013/0089076 A1* | 4/2013 | Olvera-Hernandez | H04W 36/08 370/332 |
| 2013/0308445 A1* | 11/2013 | Xiang | H04W 28/0231 370/230 |

FOREIGN PATENT DOCUMENTS

| | | |
|---|---|---|
| KR | 10-2010-0068784 A | 6/2010 |
| KR | 10-1063573 B1 | 9/2011 |
| WO | 2010/105435 A1 | 9/2010 |
| WO | 2010/147527 A1 | 12/2010 |
| WO | 2011/059267 A2 | 5/2011 |

OTHER PUBLICATIONS

Qualcomm Incorporated et al., Definition and Extension of ISRP, 3GPP TSG-CT WG1 Meeting #67, Barcelona, Spain, Oct. 11-15, 2010, C1-104229, 3GPP, Sophia-Antipolis Cedex, France.
3rd Generation Partnership Project; Technical Specification Group Core Network and Terminals; Access to the 3GPP Evolved Packet Core (EPC) via non-3GPP Access Networks; Stage 3 (Release 10), 3GPP TS 24.302, Jun. 14, 2011, pp. 1-58, V10.4.0, 3GPP, Sophia-Antipolis Cedex, France.
3rd Generation Partnership Project; Technical Specification Group Core Network and Terminals; Access to the 3GPP Evolved Packet Core (EPC)via non-3GPP access networks; Stage 3(Release 11), 3GPP TS 24.302 V11.0.0 (Sep. 2011), Sep. 28, 2011, pp. 32, 34.
3rd Generation Partnership Project; Technical Specification Group Core Network and terminals; Access Network Discovery and Selection Function (ANDSF) Management Object(MO)(Release 11), 3GPP Ts 24.312 V11.0.0 (Sep. 2011), Sep. 28, 2011, p. 31.

* cited by examiner

MOBILE COMMUNICATION SYSTEM AND METHOD OF INFORMATION PROCESSING FOR IMPROVING USER EXPERIENCE IN THE MOBILE COMMUNICATION SYSTEM

TECHNICAL FIELD

The present invention relates to a method for processing information received or to be transmitted in order to prevent the degradation of user-experienced performance during the use of a non-3GPP access network such as a wireless LAN in a situation where a 3GPP access network coexists with the non-3GPP access network.

BACKGROUND ART

Normally a mobile communication system has been developed so as to offer a communication based on user's mobility. With related technologies advanced rapidly, a mobile communication system has reached a stage to provide a high-speed data communication service as well as a voice communication.

Recently 3GPP (3rd Generation Partnership Project) has been discussing the standard of LTE (Long Term Evolution) which is one of next-generation mobile communication systems. LTE technology realizes a high-speed packet based communication that has a transmission rate up to about 100 Mbps which is higher a currently available data transmission rate. Typically discussed for this is an approach to reduce nodes disposed on channels through a simplified network structure or an approach to make wireless protocols be maximally close to wireless channels.

However, despite such efforts, it is still difficult to satisfy increasing users' demands by using limited wireless channel resources. Especially, due to the advent of smart phones, user saturation in a data communication network becomes more and more higher. In view of such situations, mobile communication operators try to solve the saturation of a data network by utilizing a non-3GPP access network, such as a wireless LAN, WiFi, or IEEE 802.11 family, which allows a user's wireless access through the ISM (Industrial Scientific Medical) band. Namely, a part of user's traffic is transmitted using a non-3GPP access network, e.g., an AP (Access Point) of a wireless LAN, rather than to a 3GPP access network through a base station. In this case, an operator can cope effectively with a rapid increase in data by using a frequency band of a non-3GPP access network as well as a frequency band of a 3GPP access network.

In order to offer a policy for selectively using a 3GPP access network, i.e., LTE, and a non-3GPP access network to UE, 3GPP defines ANDSF (Access Network Discovery and Selection Function). This will be described hereinafter with reference to FIG. 1.

FIG. 1 is a schematic diagram illustrating a typical network structure using UE and ADNSF.

Referring to FIG. 1, ANDSF communicates with UE through the S14 interface operating on the IP (Internet Protocol) layer and offers a policy associated with a selection of 3GPP and non-3GPP access networks to UE. Both UE and ANDSF employ the S14 interface on the IP layer in order to send or receive data formed of MO (Management Object) of OMA DM (Open Mobile Alliance Device Management). The IP layer connection between UE and ANDSF is offered by a 3GPP or non-3GPP access network. Additionally, to communicate with ANDSF, UE should create a secure tunnel first of all by using a separate security method. Such requirements may cause an increase in time required to offer a policy from ANDSF to UE. This means that a policy of ANDSF is not sufficient to consider dynamically changed status of UE or access network.

DISCLOSURE OF INVENTION

Technical Problem

FIG. 2 is a diagram illustrating a general operation of a typical network using a policy of ANDSF.

Referring to FIG. 2, UE receives data by using an access network 1 at operation 200. Then, at operation 202, ANDSF creates a routing policy associated with a selection of 3GPP and non-3GPP access networks and transfers it to the UE. The routing policy is Policy (in case of ISMP) or ISRP. This routing policy includes an update policy, routing criteria including location, time and APN, or the like. In case the routing policy is Policy, location only may be included instead of the routing criteria.

When handover is performed at operation 204, the UE performs a search for a specific network to be accessed on the basis of the received routing policy. Next, at operation 206, the UE receives data by using an access network 2. If handover is required again, the UE searches for another network on the basis of the received routing policy at operation 208 and performs access to a selected network.

The routing policy includes a field of the update policy and a field of the routing criteria as well as criteria about indicating which access network will be selected by the UE. The update policy indicates, using a one-bit flag, whether a request for update is allowed or not in case a policy received from the ANDSF is not suitable for the UE to use. To determine whether to update a policy by means of one-bit may cause the UE to fail to request an update in spite of a need of a policy update, or unnecessarily invite excessively frequent updates of a policy.

Meanwhile, the routing criteria include a user's location, time and APN (Access Point Name) to which a policy will be applied. The UE determines whether to apply a policy received from an operator according to the routing criteria. However, a combination of a user's location, time and APN has a limitation in fully reflecting the status of the UE and access network. For example, in case of complying with a current architecture of the ANDSF, the UE may fail to consider a congestion level of a wireless LAN network at the time of access to the wireless LAN network and, in this case, user-experienced performance may be extremely deteriorated.

Solution to Problem

In order to solve the above problems, the present invention provides a method for processing information at user equipment (UE) to improve user-experienced performance of a mobile communication system, the method comprising performing a data communication through a first network and receiving, from a policy server, a routing policy including a validity condition which is information about a condition of designating a UE status for handover; and in the handover, if a searched second network satisfies the validity condition, performing the data communication through the second network.

Additionally, in order to solve the above problems, the present invention provides a method for processing information at a policy server to improve user-experienced performance of a mobile communication system, the method comprising creating a routing policy including a validity condition which is information about a condition of designating a UE status for handover and then transmitting the routing policy to UE (User Equipment).

Advantageous Effects of Invention

According to the present invention, the UE considers the status thereof or the status of an access network when determining whether to transmit traffic by using a wireless LAN, thus improving user-experienced performance.

MODE FOR THE INVENTION

Figure 1:
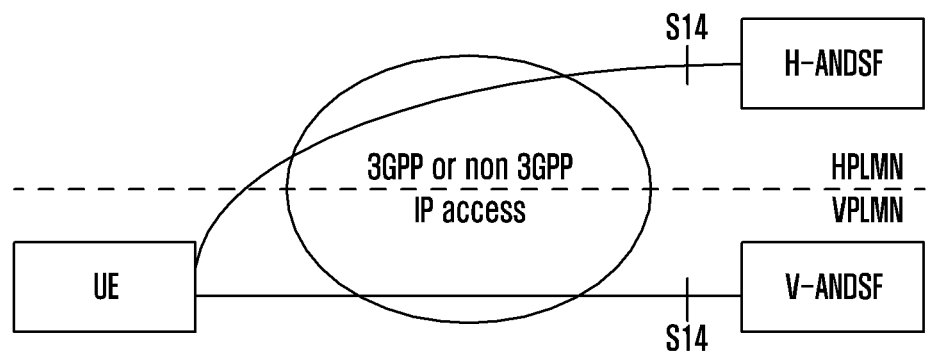
FIG. 1 is a schematic diagram illustrating a typical network structure using UE and ADNSF.
Figure 2:
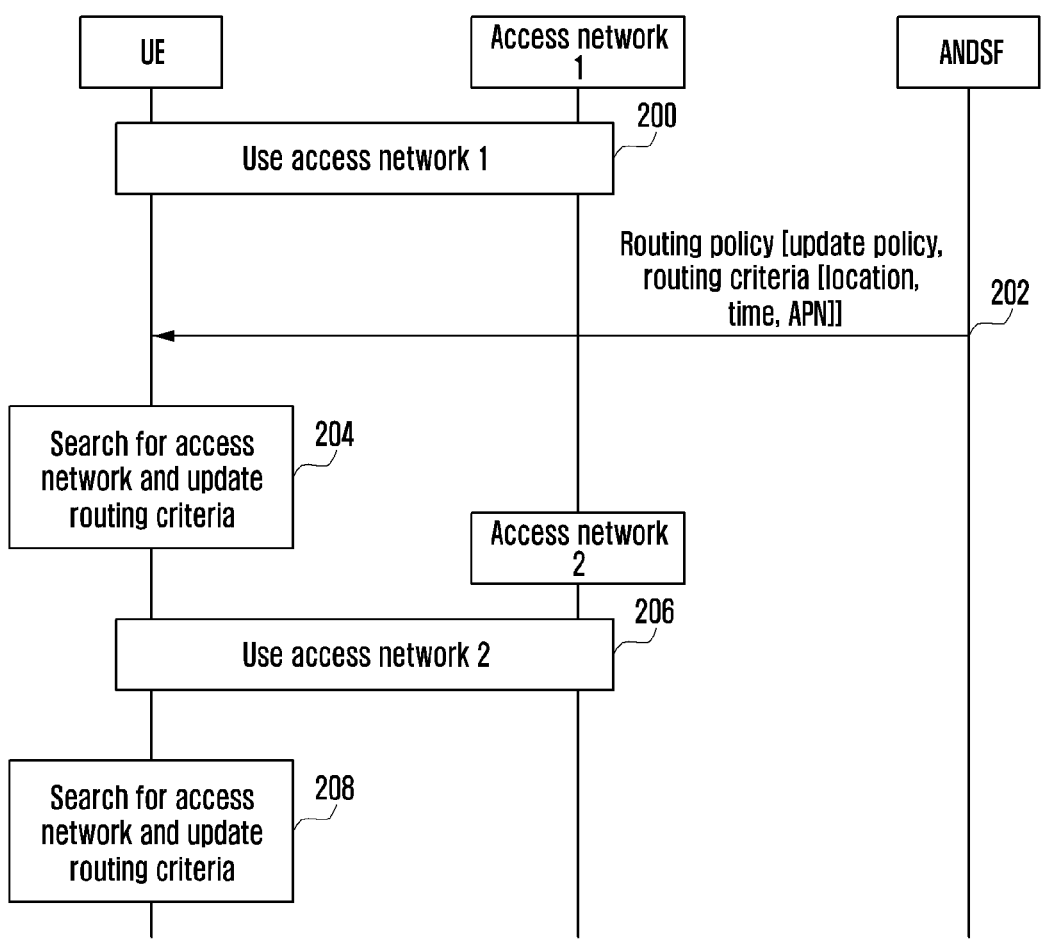
FIG. 2 is a diagram illustrating a general operation of a typical network using a policy of ANDSF.

In the following description, well known functions or configurations may not be described or illustrated in detail to avoid obscuring the essence of the present invention. Hereinafter, embodiments of the present invention will be described more fully with reference to the accompanying drawings.

Although the following description of embodiments of the present invention will be focused on a general 3GPP (3rd Generation Partnership Project) system and a wireless LAN (i.e., IEEE 802.11 family), the subject matter of the present invention may be substantially applied to any other communication/computer system having similar technical background and system configuration as will be understood by those skilled in the art. Further, although the following description of embodiments of the present invention will consider ANDSF (Access Network Discovery Service Function) or a policy server as an entity having an independent function, this may be located as being physically embodied together with any other entity within the communication system. Also, even though the description of the present invention will be based on the form of 3GPP Rel-10 ANDSF MO, various kinds of control information and associated operations proposed by this invention may be applied, with a slight variation, to any other case based on any different form of control information.

The ANDSF is the 3GPP standard for offering technology about handover between different communication networks. The ANDSF collects and stores in advance information about each network and information about operator's policy, and offers such information to UE at the request of the UE. Since the ANDSF can offer operator policy information associated with handover, it is referred to as a policy server.

In order to solve problems that may occur due to the application of a policy in connection with the selection of an access network, the present invention proposes a method for allowing the policy server to consider the status of a user and the status of an access network. For this, the first proposed scheme is to extend routing criteria contained in a routing policy (Policy or ISRP) transferred to UE by the policy server such that the extended routing criteria can include a validity condition (i.e., user status condition information). If the routing policy transferred to UE is Policy, the validity condition may be directly included in the Policy rather than being included in the routing criteria. The following description of the present invention will be focused on a case in which the routing policy is ISRP and thus the validity condition is included in the routing criteria. However, the subject matter of this invention may be applied to other case in which the routing policy is Policy and further the validity condition is directly included in the Policy.

The validity condition is information about conditions of designating UE status for handover and is information offered to UE by the policy server. The validity condition may include a combination of a UE mobility level, a UE battery life, a congestion level, and the like. When such conditions are satisfied, UE may perform handover by applying a policy. For example, only if the congestion level of a wireless LAN which can be used by UE is equal to or less than a specific congestion level specified in the routing policy, the UE may actually use the wireless LAN.

Additionally, the present invention proposes a scheme to extend an update policy expressed as a one-bit flag such that the extended update policy can include the validity condition. The validity condition in the update policy is necessary condition information for requesting the update policy and offered to UE by a policy server. Also, the validity condition in the update policy is composed of one or a combination of at least two of information about signal strength between UE and an access network, information about a UE starvation level, information about a connection attempt failure level, information about a UE battery life, and the like. When these conditions are satisfied, UE may request an update policy from the policy server.

Additionally, the present invention proposes a scheme to interwork the policy server with eNB (enhance Node B, also known as evolved Node B) in order to solve a problem caused by the operation of the policy server such as ANDSF on the IP layer and further in order to determine a policy in consideration of the status of a 3GPP access network.

Additionally, the present invention proposes a scheme to interwork the policy server with MME in order to reduce the number of interfaces required for directly interworking the policy server with eNB and further in order to consider the status of a core network as well as a 3GPP access network.

Figure 3:
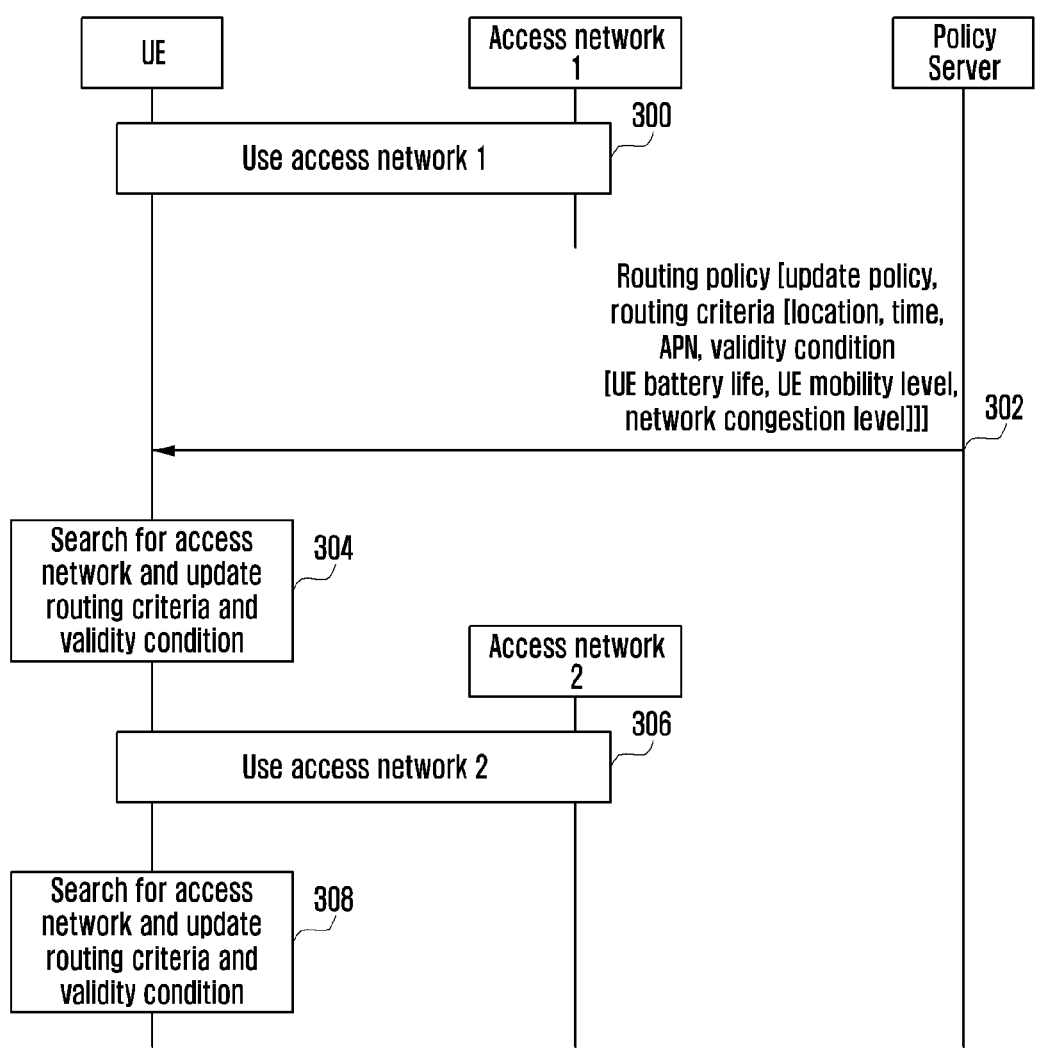
FIG. 3 is a diagram illustrating a method for transferring a routing policy between mobile communication systems in accordance with the first embodiment of the present invention.

FIG. 3 is a diagram illustrating a method for transferring a routing policy between mobile communication systems in accordance with the first embodiment of the present invention. Namely, FIG. 3 shows a scheme in which extended routing criteria include a validity condition (i.e., user status condition information). The validity condition refers to conditions offered to UE (User Equipment) by a policy server, including a combination of information about a UE mobility level, a UE battery life, a congestion level, and the like. When these conditions are satisfied, the UE may perform handover by applying a policy.

At operation 300, the UE performs an IP communication by using the first network, i.e., an access network 1, connected thereto. At operation 302, the policy server creates a routing policy according to an operator policy and transfers it to the UE. Here, since a process of connecting the UE and the policy server is a well known function, a description thereof will be skipped. According to the present invention, a validity condition (i.e., user status condition information) is newly contained in routing criteria. This validity condition is composed of one or a combination of at least two of information about a UE battery life, information about a UE mobility level, and information about a congestion level of an access network measured by the UE. Such condition information is defined as a threshold concept, and the UE may apply a routing policy for selecting an access network only if a measured value satisfies a given condition.

Next, at operation 304 for handover, the UE performs a search for an access network contained in given policy criteria. Then the UE checks a validity condition contained in routing criteria. If an access network 2 which is the second network satisfies a given validity condition, the UE performs a data communication by using the access network 2 at operation 306 and from then on. For example, if the congestion level (e.g., a round trip time of packet, a congestion window size, a STA number, a utilization level, etc.) of the wireless LAN access network 2 measured by the UE is equal to or less than a congestion level contained in the validity condition, the UE transmits and receives data through access to the wireless LAN access network 2.

Additionally, at operation 308, the UE checks the status of the second network by continuously checking the validity condition contained in the routing criteria. If the validity condition is not satisfied, the UE changes an access network. Alternatively, if the validity condition is not satisfied, the UE requests a policy update from the policy server.

In FIG. 3, the UE receives the policy criteria during a data communication with a specific access network and, at the time of handover, determines whether a target network satisfies the validity condition. If the target network satisfies the validity condition, the UE may perform a data communication through a connection with the target network.

Figure 4:
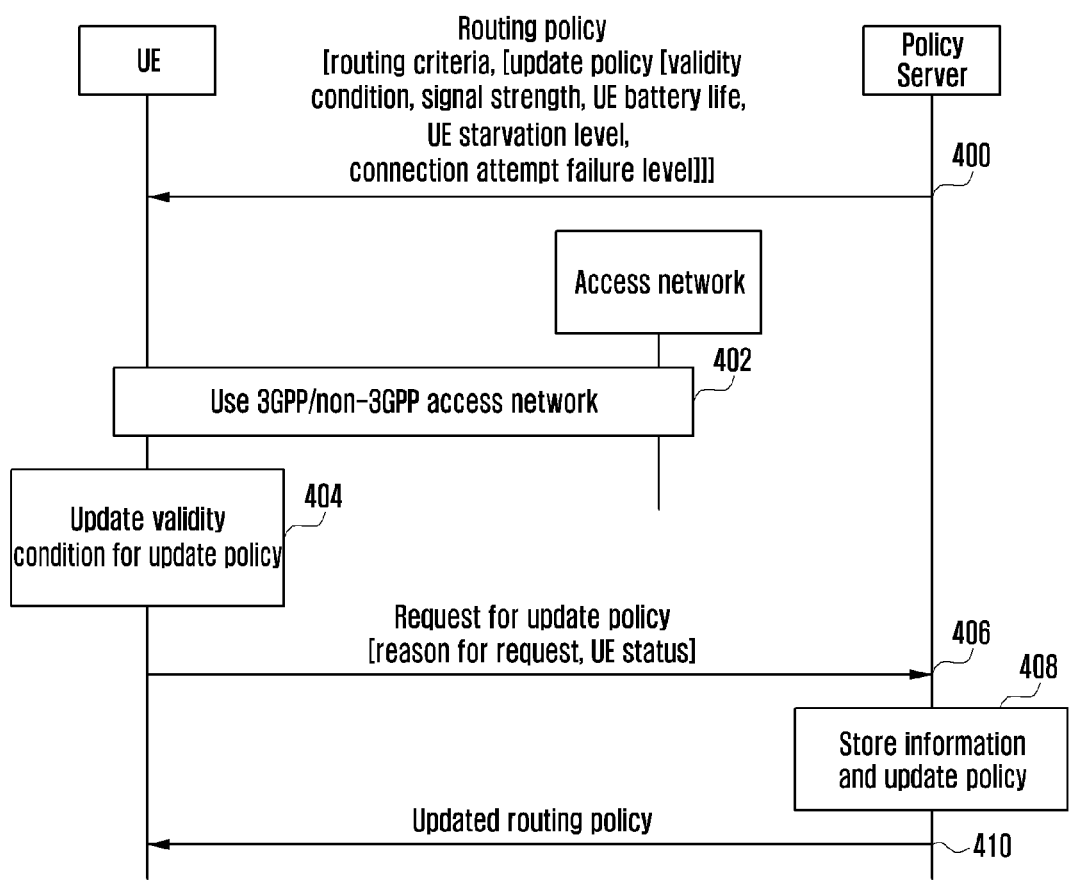
FIG. 4 is a diagram illustrating a method for transferring a routing policy between mobile communication systems in accordance with the second embodiment of the present invention.

FIG. 4 is a diagram illustrating a method for transferring a routing policy between mobile communication systems in accordance with the second embodiment of the present invention. Specifically, FIG. 4 shows a scheme in which an update policy which has been expressed as a one-bit flag in a routing policy is extended so as to include a validity condition (i.e., user status condition information) according to the second embodiment. The validity condition contained in the update policy refers to conditions offered to UE by a policy server and is composed of one or a combination of at least two of information about signal strength between the UE and an access network, information about a UE starvation level, information about an attempt failure level, information about a UE battery life, and the like. When these conditions are satisfied, the UE may request a new update policy from a policy server.

Referring to FIG. 4, the policy server offers a routing policy to the UE at operation 400. At this operation, the routing policy includes routing criteria and an update policy. And the update policy contains a validity condition (i.e., user status condition information). The validity condition may be composed of one or a combination of at least two of information about signal strength between the UE and an access network, information about a UE battery life, information about a UE mobility level, information about a UE starvation level, information about an attempt failure level, and the like. This validity condition is a threshold concept, and the UE may send a request for an update policy to the policy server if a measured value satisfies a given validity condition.

At operation 402, the UE performs a data communication with an access network through a 3GPP/non-3GPP connection. Then, at operation 404, the UE checks a validity condition contained in the update policy received from the policy server at operation 400. If a current UE status or cell status satisfies the validity condition, the UE transmits a request for an update policy to the policy server at operation 406. At this time, the UE transfers a reason for request and information about a current UE status, together with a request for an update policy. The reason for request may be one of extreme starvation, an attempt failure, a low UE battery life, and the like. The current UE status indicates an actual status of the UE, including a starvation level, an attempt failure level, a residual quantity of UE battery, and the like.

Then, at operation 408, the policy server stores therein information contained in the update policy request received from the UE. Further, the policy server updates a new routing policy by checking the status of the UE and an access network through the information from the UE. Next, at operation 410, the policy server transfers the updated routing policy to the UE.

Figure 5:
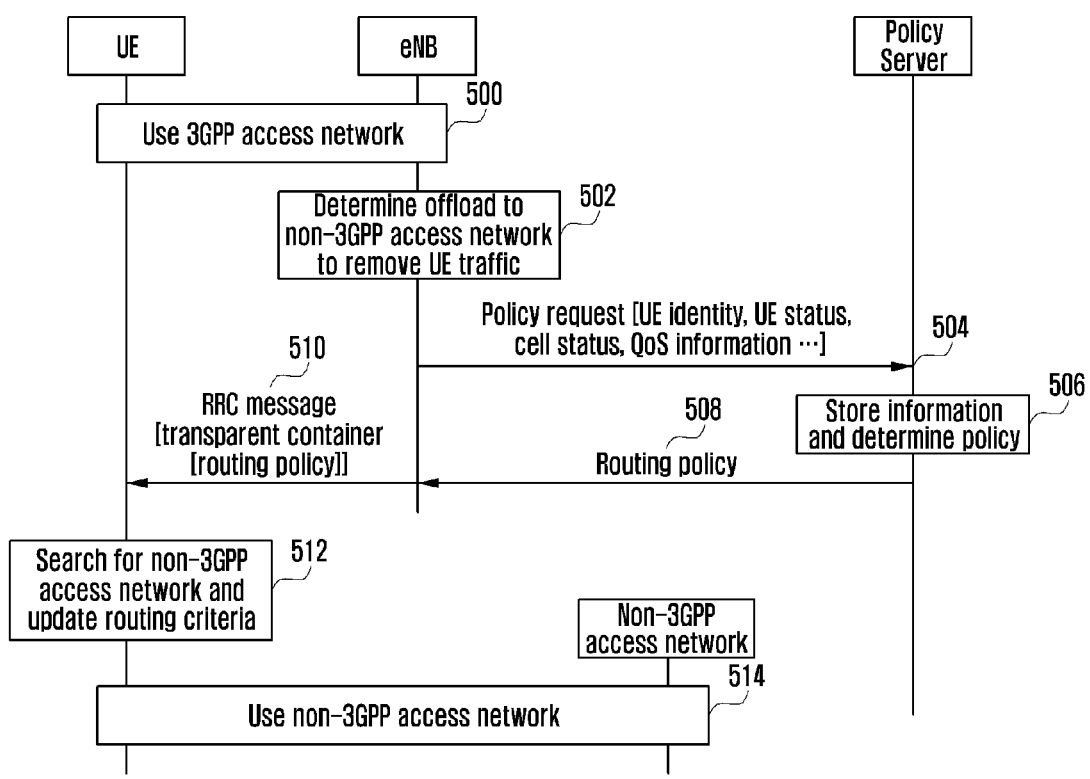
FIG. 5 is a diagram illustrating a method for transferring a routing policy between mobile communication systems in case a policy server operates on an IP layer in accordance with an embodiment of the present invention.

FIG. 5 is a diagram illustrating a method for transferring a routing policy between mobile communication systems in case a policy server operates on an IP layer in accordance with an embodiment of the present invention. Specifically, FIG. 5 shows a scheme in which the policy server such as ANDSF operates on the IP layer and thereby is interworked with eNB (enhance Node B, also known as evolved Node B) such that a routing policy can be determined in consideration of the status of a 3GPP access network. The eNB is a node that can continuously check the status of UE in a connected mode and also directly check the status of the 3GPP access network.

Referring to FIG. 5, at operation 500, the UE accesses the eNB and performs a data communication using the 3GPP access network. At operation 502, the eNB checks the status of a cell or the status of the UE. The cell status includes information about a cell location, a congestion level, or the like, and the UE status includes information about a UE location or the like.

If the cell status or the UE status needs handover, namely, if non-3GPP access is determined to remove UE traffic, the eNB requests at operation 504 the policy server to create a routing policy for moving the UE to a non-3GPP access network. This request for the creation of the routing policy may include information about the UE or 3GPP access network in order for the policy server to create the routing policy according to the UE status, and may further include information about QoS related matters of the UE.

At operation 506, the policy server stores therein such information, received from the eNB, about the UE or 3GPP access network and QoS related matters of the UE. Additionally, the policy server determines a routing policy in consideration of the stored information. As discussed above in FIGS. 3 and 4, this routing policy may include the extension of routing criteria and update policy.

At operation 508, the policy server transfers the created routing policy to the eNB. Then, at operation 510, the eNB transfers the routing policy, received from the policy server, to the UE. At this operation, the eNB transfers the routing policy by using RRC message of the 3GPP access network. The RRC message has a security based on a security scheme between the UE and the eNB and allows a considerable reduction in a delay time because of packet transmission on the layer 2 level.

At operation 512, the UE performs a search for a non-3GPP access network for handover and determines whether the searched access network satisfies the routing criteria. If the access network satisfies the routing criteria, the UE performs at operation 514 a data communication by using the non-3GPP access network.

Meanwhile, using SIB (System Information Block) which is information broadcasted through a broadcast channel, the eNB may notify whether any non-3GPP access network accessible by the UEs exists within its own coverage. For example, if there is any accessible wireless LAN in the coverage of the eNB, the eNB transmits the "LAN exists" flag marked with "Yes" through SIB. Then the UEs can recognize in advance whether a usable wireless LAN exists or not. If the above flag is marked with "No", the UE may skip an unnecessary channel search since there is no usable wireless LAN. Alternatively, the eNB may insert the type of a non-3GPP access network, which is usable in the coverage, into the SIB. For example, if indexes indicating WLAN and WiMAX are contained in a neighbor non-3GPP access network list of the SIB, the UE can recognize in advance that usable WLAN and WiMAX exist nearby.

Figure 6:
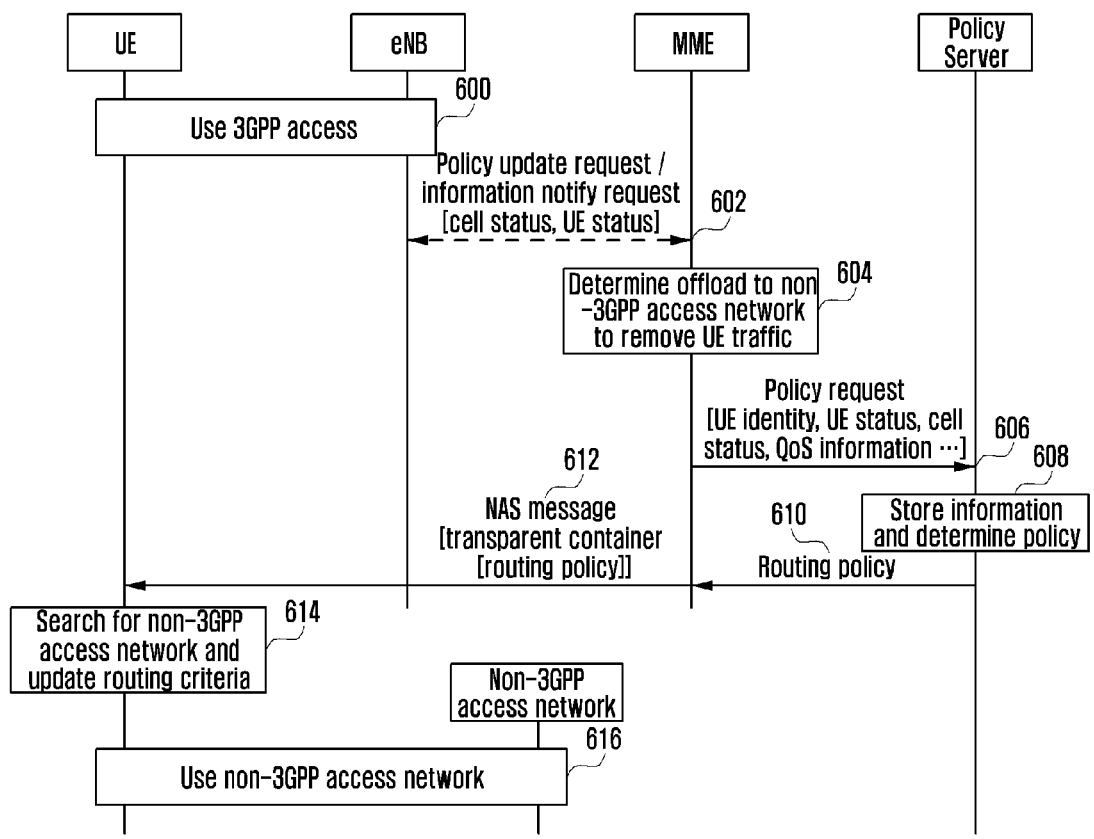
FIG. 6 is a diagram illustrating a method for transferring a routing policy between mobile communication systems in case a policy server interworks with MME in accordance with an embodiment of the present invention.

FIG. 6 is a diagram illustrating a method for transferring a routing policy between mobile communication systems in case a policy server interworks with MME in accordance with an embodiment of the present invention. Specifically, FIG. 6 shows a scheme in which the policy server is interworked with MME (Mobility Management Entity) such that the number of interfaces required for directly interworking the policy server such as ANDSF with the eNB can be reduced and also the status of a core network as well as a 3GPP access network can be considered. The MME stores the status of the UE which is in an idle mode as well as in a connected mode.

Referring to FIG. 6, at operation 600, the UE accesses the eNB and performs a data communication using the 3GPP access network. At operation 602, the eNB requests the policy server to create a routing policy for moving the UE to a non-3GPP access network, depending on a cell status or a UE status. The cell status may include information about a cell location, a congestion level, or the like, and the UE status may include information about a UE location or the like. This operation 602 is an additional step and thus may be skipped.

At operation 604, the MME determines to move the UE to the non-3GPP access network on the basis of the UE status or cell status checked autonomously or information received from the eNB. Then, at operation 606, the MME requests the policy server to create a routing policy. This request for the creation of the routing policy may include information about the cell status or UE status such that the policy server can collect information about the UE or 3GPP access network and reflect it on the creation of the routing policy, and may further include QoS related matters of the UE.

At operation 608, the policy server stores therein such information about the cell status or UE status received from the MME, and then determines a routing policy in consideration of the stored information. As discussed above in FIGS. 3 and 4, this routing policy may include the extension of routing criteria and update policy.

At operation 610, the policy server transfers the created routing policy to the MME. Then, at operation 612, the MME transfers the routing policy, received from the policy server, to the UE. At this operation, the MME transfers the routing policy by using NAS message. The NAS message has a security based on a security scheme between the UE and the MME.

Next, at operation 614, the UE performs a search for a non-3GPP access network and determines whether the routing criteria are satisfied. If the searched access network satisfies the routing criteria, the UE performs at operation 616 a data communication by using the non-3GPP access network.

In brief, a method proposed by this invention in order to improve user-experienced performance when the UE performs handover, is as follows.

A mobile communication system is composed of UE (User Equipment), a policy server, and a network accessed by the UE to transmit and receive data. In the mobile communication system, the policy server may be formed as an independent element or alternatively as being interworked with eNB or MME.

According to the present invention, the policy server checks a current UE status and cell status and then creates a validity condition (i.e., user status condition information). The validity condition refers to conditions of designating the UE status for performing handover or information about necessary conditions of requesting an update policy. The validity condition is contained in routing criteria constituting the routing policy or in the update policy.

While transmitting or receiving data through a network, the UE checks, through routing criteria received from the policy server, the validity condition which is condition information for designating the UE status for performing handover. In such handover, if the status of a searched network satisfies the validity condition, the UE performs a seamless data communication after handover to the network.

Alternatively, the policy server transfers, to the UE, a routing policy including information about necessary conditions of requesting an update policy. If a current UE status satisfies the validity condition, the UE requests the update policy from the policy server. At this time, the UE transfers information about a current UE status and cell status together with the request for the update policy. Then the policy server creates a routing policy by referring to information about the received UE status and cell status. And the policy server transfers the created routing policy to the UE.

As discussed hereinbefore, the routing policy is created at the policy server in consideration of a current UE status or network status, and if the routing policy is satisfied, the UE performs handover or requests an update policy. Therefore, user-experienced performance can be enhanced.

While the present invention has been particularly shown and described with reference to an exemplary embodiment thereof, it will be understood by those skilled in the art that various changes in form and details may be made therein without departing from the spirit and scope of this invention as defined by the appended claims.

The invention claimed is:

1. A method for performing a handover by a terminal, the method comprising:
receiving wi-fi offloading information including a wireless local access network (WLAN) access threshold from a base station of a first network;
identifying a signal received from a second network corresponding to a WLAN;
comparing a signal strength of the received signal with the WLAN access threshold included in the wi-fi offloading information;

and
receiving a data packet from the second network when the signal strength of the second network is equal to or greater than the WLAN access threshold.

2. The method of claim 1,
wherein the wi-fi offloading information is received via a radio resource control (RRC) message.

3. The method of claim 1,
wherein the wi-fi offloading information is received via a system information block (SIB).

4. The method of claim 1,
wherein the wi-fi offloading information is transmitted from an access network discovery and selection function (ANDSF) to the base station.

5. A terminal for performing a handover, the terminal comprising:
a transceiver configured to receive wi-fi offloading information including a wireless local access network (WLAN) access threshold from a base station of a first network; and
a controller configured to:
identify a signal received from a second network corresponding to a WLAN,
compare a signal strength of the received signal with the WLAN access threshold included in the wi-fi offloading information,
compare a signal strength of the received signal with the WLAN access threshold included in the wi-fi offloading information,
and
receive a data packet from the second network when the signal strength of the second network is equal to or greater than the WLAN access threshold.

6. The terminal of claim 5,
wherein the wi-fi offloading information is received via a radio resource control (RRC) message.

7. The terminal of claim 5,
wherein the wi-fi offloading information is received via a system information block (SIB).

8. The terminal of claim 5,
wherein the wi-fi offloading information is transmitted from an access network discovery and selection function (ANDSF) to the base station.

9. A method for performing a handover by a base station of a first network, the method comprising:
receiving wi-fi offloading information including a wireless local access network (WLAN) access threshold from an access network discovery and selection function (ANDSF); and
transmitting the wi-fi offloading information including the WLAN access threshold to a terminal,
wherein a signal received from a second network corresponding to a WLAN is identified by the terminal,
wherein a signal strength of the received signal is compared with the WLAN access threshold included in the wi-fi offloading information by the terminal, and
wherein a data packet is received from the second network when the signal strength of the second network is equal to or greater than the WLAN access threshold.

10. The method of claim 9,
wherein the wi-fi offloading information is transmitted via a radio resource control (RRC) message.

11. The method of claim 9,
wherein the wi-fi offloading information is transmitted via a system information block (SIB).

12. A base station for performing a handover, the base station comprising:
a transceiver configured to:
receive wi-fi offloading information including a wireless local access network (WLAN) access threshold from an access network discovery and selection function (ANDSF), and
transmit the wi-fi offloading information including the WLAN access threshold to a terminal; and
a controller configured to control the transceiver,
wherein a signal received from a second network corresponding to a WLAN is identified by the terminal,
wherein a signal strength of the received signal is compared with the WLAN access threshold included in the wi-fi offloading information by the terminal, and
wherein a data packet is received from the second network when the signal strength of the second network is equal to or greater than the WLAN access threshold.

13. The base station of claim 12,
wherein the controller is further configured to control the transceiver to transmit the wi-fi offloading information via a radio resource control (RRC) message.

14. The base station of claim 12,
wherein the controller is further configured to control the transceiver to transmit the wi-fi offloading information via a system information block (SIB).

\* \* \* \* \*